United States Patent
Olesen et al.

(10) Patent No.: US 11,889,433 B2
(45) Date of Patent: Jan. 30, 2024

(54) CONTROLLING TRANSMISSION POWER OF RADIO DEVICE

(71) Applicant: NOKIA SOLUTIONS AND NETWORKS OY, Espoo (FI)

(72) Inventors: Poul Olesen, Støvring (DK); Bent Henneberg Rysgaard, Aalborg (DK)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/762,897

(22) PCT Filed: Mar. 18, 2020

(86) PCT No.: PCT/EP2020/057471
§ 371 (c)(1),
(2) Date: Mar. 23, 2022

(87) PCT Pub. No.: WO2021/185441
PCT Pub. Date: Sep. 23, 2021

(65) Prior Publication Data
US 2022/0386250 A1 Dec. 1, 2022

(51) Int. Cl.
*H04W 52/38* (2009.01)
(52) U.S. Cl.
CPC .................. *H04W 52/38* (2013.01)
(58) Field of Classification Search
CPC .............................. H04W 52/38; H04L 1/0029
See application file for complete search history.

(56) References Cited

U.S. PATENT DOCUMENTS

| 9,781,685 B2 | 10/2017 | Tsui et al. |
| 10,142,948 B2 * | 11/2018 | Rao ..................... H04W 52/247 |
| 11,533,639 B2 * | 12/2022 | Hyslop .............. H04B 7/18506 |

(Continued)

FOREIGN PATENT DOCUMENTS

EP  3107323 B1  8/2019

OTHER PUBLICATIONS

Office Action dated Dec. 6, 2022, corresponding to Indian Patent Application No. 202247053523.

(Continued)

*Primary Examiner* — Hai V Nguyen
(74) *Attorney, Agent, or Firm* — SQUIRE PATTON BOGGS (US) LLP

(57) ABSTRACT

There is provided co-channel interference mitigation by power adjustments that take into account sensitivity improvement provided by the sky communications. In connection with a communications network configured for ground communications and sky communications one radio device performs transmission power control of another radio device. If at the controlling radio device, a radio link is determined to be sky communications, at least one power adjustment for controlling the transmission power of the other radio device is determined in accordance with one or more power control parameters for sky communications. The transmission power of the second radio device is controlled by the first radio device, on the basis of the determined at least one power adjustment. In this way co-channel interference mitigation is supported by power adjustments that take into account sensitivity improvement provided by the sky communications.

13 Claims, 9 Drawing Sheets

(56) References Cited

U.S. PATENT DOCUMENTS

| | | | | |
|---|---|---|---|---|
| 11,545,737 B2* | 1/2023 | Cordone | ............... | H01Q 25/02 |
| 11,570,631 B2* | 1/2023 | Hyslop | ................. | H01Q 1/246 |
| 11,582,691 B2* | 2/2023 | Matsuda | .............. | H04W 48/12 |
| 2007/0123290 A1* | 5/2007 | Stenmark | ............ | H04W 52/288 |
| | | | | 455/343.1 |
| 2012/0200458 A1* | 8/2012 | Jalali | ................... | H01Q 21/062 |
| | | | | 342/372 |
| 2019/0006886 A1* | 1/2019 | Bando | ................ | H02M 7/5387 |
| 2020/0100192 A1* | 3/2020 | Rao | .................... | H04W 52/247 |

OTHER PUBLICATIONS

"Numerical Evaluation of Antenna Noise Temperature for Optimal Reflector Antenna Designs", Shenheng Xu and Rahmat-Samii, 2011 IEEE International Symposium on Antennas and Propagation (APSURSI), Jul. 3-8, 2011.

Influence of Antenna Noise Temperature and Downtilt on WCDMA Base Station Capacity, Karl-August Steinhauser, Kathrein-Werke KG, Rosenheim, Germany, 2009 3rd European Conference on Antennas and Propagation, Mar. 23-27, 2009.

International Search Report and Written Opinion dated Dec. 11, 2020 corresponding to International Patent Application No. PCT/EP2020/057471.

* cited by examiner

US 11,889,433 B2

CONTROLLING TRANSMISSION POWER OF RADIO DEVICE

TECHNICAL FIELD

The present invention relates to controlling a transmission power of a radio device.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Antenna noise temperature for directional antennas pointing close to and near the horizon is strongly depending on the radiation pattern of the antenna and on antenna tilt.

Antenna noise temperature affects the link budget directly in situations where co-channel noise is limited by thermal noise. Base station antennas are currently designed and deployed with down tilt with the aim to reduce the co-channel interference and thereby enhance network capacity.

Co-channel interference in wireless communications networks can negatively affect the network capacity. If unmanned aerial vehicles (UAVs), such as drones, are supported by the communications networks and are airborne, their transmissions can propagate freely and cause co-channel interference even to base stations that are far away. The network capacity is more strongly affected by the co-channel interference caused by the UAVs particularly if the number of UAVs is large. If UAVs have significantly more uplink traffic than downlink traffic, a level of the co-channel interference caused by the UAVs relative to their number can be unexpectedly high.

SUMMARY

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According some aspects, there is provided the subject matter of the independent claims. Some further aspects are defined in the dependent claims. The embodiments that do not fall under the scope of the claims are to be interpreted as examples useful for understanding the disclosure.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

Figure 1:
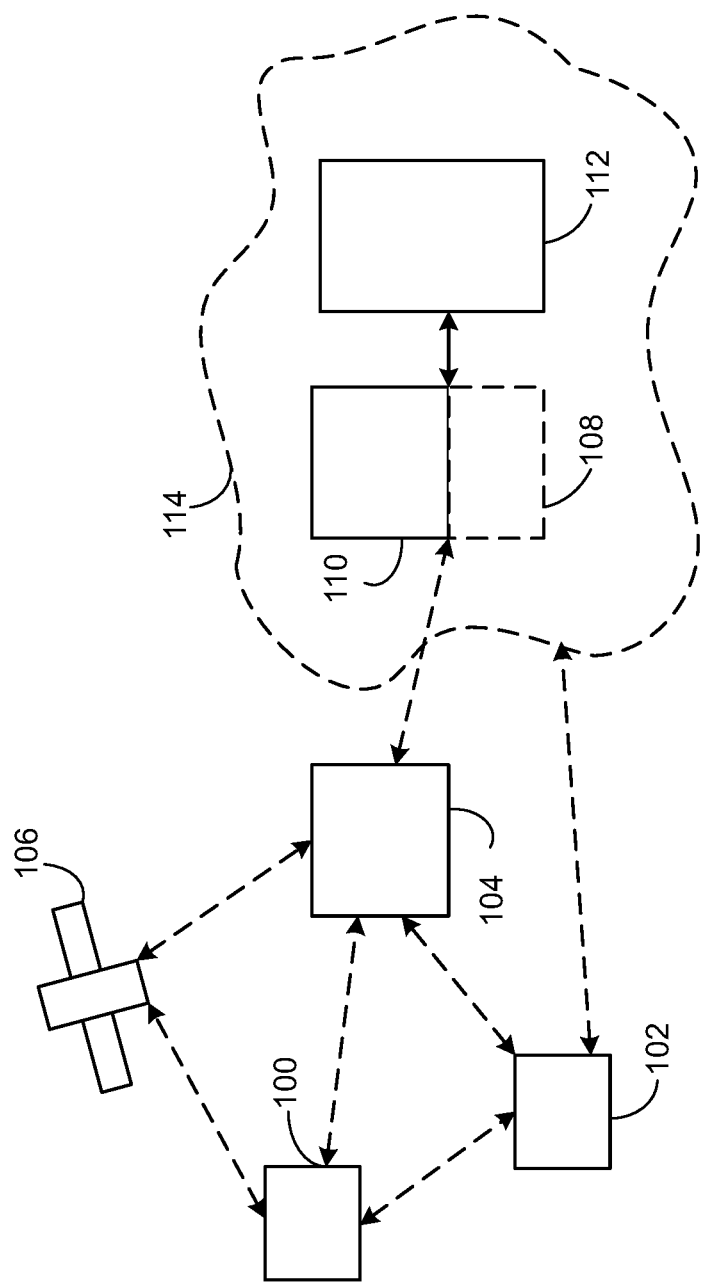
FIG. 1 shows a part of an exemplifying wireless communications access network in accordance with at least some embodiments of the present invention.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

In connection with a communications network configured for ground communications and sky communications one radio device performs transmission power control of another radio device. If at the controlling radio device, a radio link is determined to be sky communications, at least one power adjustment for controlling the transmission power of the other radio device is determined in accordance with one or more power control parameters for sky communications. The transmission power of the second radio device is controlled by the first radio device, on the basis of the determined at least one power adjustment. In this way co-channel interference mitigation is supported by power adjustments that take into account sensitivity improvement provided by the sky communications.

A radiation pattern of an antenna may refer to a directional dependence of the strength of the radio waves from the antenna or from another source of radio waves. The radiation pattern may have one or more main lobes. A receiving gain of the antenna may be optimized in the direction of the main lobe.

A communications direction of an antenna comprises a direction of a radiation pattern of the antenna. The direction of a radiation pattern may be defined by a main lobe the antenna. Accordingly, the antenna may be a directional antenna.

Ground communications comprises communications directions of a receiving antenna on a wireless link, where a radiation pattern or at least a main lobe of the antenna is directed below the horizon, for example towards the ground. In this way the antenna pattern may be directed to a radio device located close to the ground or at the ground.

Sky communications comprises communications directions of a receiving antenna on a wireless link, where a radiation pattern or at least a main lobe of the antenna is directed above the horizon, for example towards the sky. In this way the antenna pattern may be directed to a radio device located at an elevated position with respect to the receiving antenna for example at a higher elevation from the ground. It should be appreciated that a radiation pattern of the receiving antenna or at least a main lobe of the receiving antenna may be directed above the horizon, when there is open space, for example an ocean or a plain or elevation of the ground decreases behind a radio device as seen from a receiving antenna. The radiation pattern may be even directed above the radio device, thus to a higher altitude. The higher altitude may provide a reduced thermal noise at the receiving antenna, whereby less transmission power may be needed to achieve a desired SNR at the receiving antenna. Tilt of the antenna or beam of the antenna may define whether the communications direction of the antenna is directed towards the horizon, directed above the horizon, i.e. towards the sky, or directed below the horizon, i.e. towards the ground.

A wireless link is formed, between radio devices, when the radio devices are located within a range of wireless communications. The communications range is a range, where successful reception of radio signals between the radio devices is possible. The wireless link may be sky communications or ground communications.

A radio device may be a device configured for communications on radio waves over a wireless radio link, i.e. a wireless link. The communications may comprise user traffic and/or signaling. The user traffic may comprise data, voice, video and/or audio. Examples of the wireless link comprise a point-to-point wireless link and a point-to-multipoint wireless link. The wireless link may be provided between two radio devices. It should be appreciate that, although the radio devices may have differences. For example, radio devices connected by a wireless link may comprise one or more of a user equipment (UE), an access node, an access point, a relay node, a user terminal and an Internet of Things (IoT) device. The radio device may be configured for sky communications and ground communications. In an example, the radio device may comprise one or more antennas that may be tilted in vertical direction with respect to the ground for communications over wireless links that are sky communications and ground communications depending on the tilting angle. Additionally, also turning the antennas in a horizontal direction may be supported. Alternatively or additionally, the radio device may be configured to support beam steering for adapting a radiation pattern of at least one of the antennas. The beam steering may provide that a communications direction of a main lobe of the radiation pattern is directed for communications over wireless links that are sky communications and/or ground communications depending on the direction of the main lobe.

A radio device may be a radio access device that is configured to serve a plurality of other radio devices, user radio devices, and give radio access to a communications system for the user radio devices. A radio device may also be a radio station serving as relay node or providing a wireless backhaul for one or more radio access nodes. Examples of the radio access devices comprise at least an access node, an access point, a base station and an (e/g) NodeB. Examples of the user radio devices comprise at least a user terminal and user equipment (UE). The radio device may be an aerial radio device and/or an extraterrestrial radio device configured to operate above the ground without a fixed installation to a specific altitude. Examples of extraterrestrial radio devices comprise at least satellites and spacecraft that are configured for radio communications in a communications system that may comprise both terrestrial and extraterrestrial radio devices. Examples of aerial radio devices comprise aircraft, at least High Altitude Platform Stations (HAPSs) and unmanned aerial vehicles (UAVs), such as drones. The radio access device may have one or more cells which the user radio devices may connect to in order to access the services of the communications system via the radio access device. The cells may comprise different sizes of cells, for example macro cells, micro cells, pico cells and femto cells. A macro cell may be a cell that is configured to provide coverage over a large coverage area in a service area of the communications system, for example in rural areas or along highways. A micro cell may be a cell that is configured to provide coverage over a smaller coverage area than the macro cell, for example in a densely populated urban area. Pico cells may be cells that are configured to provide coverage over a smaller area than the micro cells, for example in a large office, a mall or a train station. Femto cells may be cells that are configured to provide coverage over a smaller area than the femto cells, for example at homes or small offices. For example macro cells provide coverage for user radio devices passing a city on a motorway/highway and local cells, e.g. micro cells or smaller cells, provide coverage for user radio devices within the city. In another example, macro cells provide coverage for aerial radio devices and/or extraterrestrial radio devices and local cells, e.g. micro cells or smaller cells, provide coverage for the aerial radio devices and/or extraterrestrial radio devices that are located at elevated positions with respect to one or more radio access devices of the communications system. Accordingly, an aerial radio device or extraterrestrial radio device may be connected to a micro cell of a radio access device and when the aerial radio device or extraterrestrial radio device is above a certain height from the ground, the aerial radio device or extraterrestrial radio device may be switched to a macro cell, for example by a handover procedure.

Legacy base station antennas are pointing towards the ground whereby their antenna noise temperature is limited to 270 K to 300 K. The thermal noise floor at receive input is therefore about −174 dBm/Hz, which can be used for current models, network planning and functionality of wireless communications systems. However, when a base station antenna is pointing above the horizon, e.g. towards the sky, thermal noise power received by the antenna is less than −174 dBm in systems limited by thermal noise, whereby sensitivity of the base station is improved compared with the antennas pointing to the ground. Examples in accordance with at least some embodiments provide mitigation against co-channel interference by power adjustments for sky communications.

A power adjustment may be a step for controlling a transmission power of a radio device. The power adjustment may be included in a transmission power control (TPC) command. The step may be in accordance with one or more power control parameters. A TPC command may indicate an increase or a decrease of transmission power. The power control parameters may be for sky communications or ground communications.

Accordingly, the power control parameters may be at least partially different for sky communications and ground communications. In an example the step may define a power increase or a power decrease in dB. Initial power control of a radio device may be performed in 2 dB steps for example in response to a Random Access Channel (RACH) procedure message from the radio device. After the initial power control using the 2 dB steps, the power control steps may be 1 or 4 dB steps, up or down. The power control after the initial power control may be performed for example during a Physical Uplink Shared Channel (PUSCH) power control adjustment state.

Next examples in accordance with at least some embodiments are described in a context of one radio device controlling a transmission power of another radio device. The radio device controlling the transmission power is referred to a radio access device and the radio device, whose transmission power is controlled by the radio access device is referred to a user radio device.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage. The access node provides access by way of communications of radio frequency (RF) signals and may be referred to a radio access node. It should be appreciated that the radio access network may comprise more than one access nodes, whereby a handover of a wireless connection of the user device from one cell of one access node, e.g. a source cell of a source access node, to another cell of another node, e.g. a target cell of a target access node, may be performed.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, wireless device, communications device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being capable of being integrated with existing legacy radio access technologies, such as the Long-Term Evolution (LTE). Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mm Wave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or NodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)NodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)NodeBs), a home node B gateway, or HNB-GW (not shown in FIG. 1). A HNB Gateway (HNB-GW), which is typically installed within an operator's network may aggregate traffic from a large number of HNBs back to a core network.

The embodiments are not, however, restricted to the system given as an example but a person skilled in the art may apply the solution to other communication systems provided with necessary properties.

Figure 2:
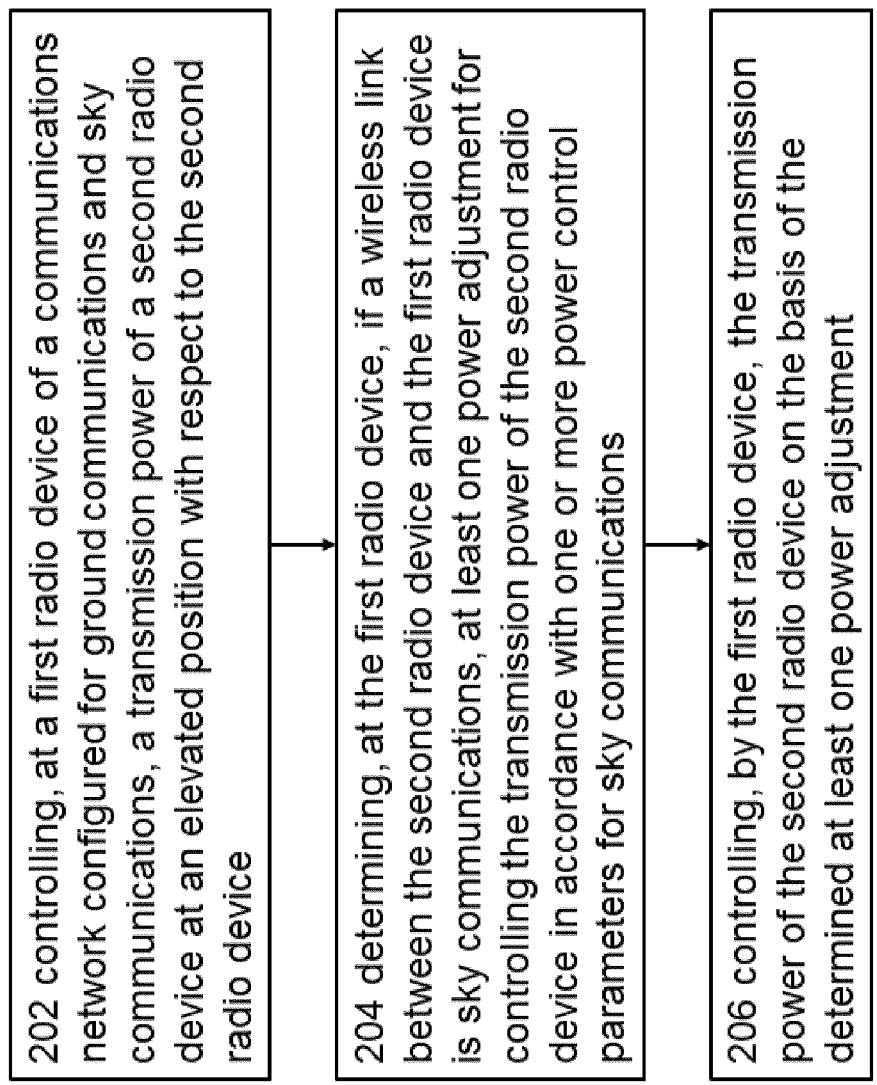
FIGS. 2 to 4 illustrate examples of methods in accordance with at least some embodiments of the present invention.

Referring to FIG. 2, there is provided an example of a method for supporting co-channel interference mitigation by a transmission power control which takes into account sensitivity improvement provided by sky communications. The method phases may be performed by a radio access device, for example.

Phase 202 comprises controlling, at a radio access device of a communications network configured for ground communications and sky communications, a transmission power of a user radio device at an elevated position with respect to the user radio device.

Phase 204 comprises determining, at the radio access device, if a wireless link between the user radio device and the radio access device is sky communications, at least one power adjustment for controlling the transmission power of the user radio device in accordance with one or more power control parameters for sky communications.

Phase 206 comprises controlling, by the radio access device, the transmission power of the user radio device on the basis of the determined at least one power adjustment. In this way, the transmission power may be controlled using the determined at least one power adjustment.

In an example, phase 206 may comprise controlling the transmission power of the user device in accordance with an open loop power control scheme. The open loop power control scheme comprises the radio access device transmitting a transmission power control command comprising the determined at least one power adjustment to the user radio device. The user radio device may then adjust its transmission power on the basis of the transmission power control command.

In an example phase 204 comprises determining, at the radio access device, whether the wireless link between the user radio device and the radio access device is sky communications or ground communications, and if the wireless link is sky communications, the at least one power adjustment for controlling the transmission power of the user radio device in accordance with one or more power control parameters for sky communications is determined.

In an example in accordance with at least some embodiments, phase 204 comprises determining, at the radio access device, if the wireless link between the user radio device and the radio device is ground communications, at least one power adjustment for controlling the transmission power of the user radio device in accordance with one or more power control parameters for ground communications.

In an example in accordance with at least some embodiments, phase 204 comprises determining, at the radio access device, whether the wireless link between the user radio device and the radio device is ground communications or sky communications on the basis of at least one of:
- an antenna noise temperature of the radio access device;
- a change of signal to noise ratio at the radio access device;
- a handover of the user radio device between a cell for ground communications and a cell for sky communications;
- 3D position information of the user radio device;
- topographic information of area underlying the wireless link;
- a receiving antenna pattern;
- physical installation data of radio access device antenna for receiving the transmission.

In an example in accordance with at least some embodiments, phase 204 comprises determining, at the radio access device, the wireless link between the user radio device and the radio device to be sky communications, on the basis of an antenna noise temperature. In an example the sky communications may be determined, when the antenna noise temperature is up to 200K, in the range of 200K to 100K or less, 50K or less, particularly 10K or less for a directional antenna and particularly 4K or less for an antenna with increased directionality.

In an example, phase 204 comprises determining, at the radio access device, an antenna noise temperature of the radio access device and if the antenna noise temperature is less than a threshold for the antenna noise temperature, the wireless link may be determined to be sky communications. The threshold may be for example up to 200K. Also smaller values may be used, in the range of 200K to 100K or less, 50K or less, particularly 10K or less for a directional antenna and particularly 4K or less for an antenna with increased directionality. In practice, the threshold may be set such that a sufficient signal level at the radio access device is provided.

In an example, phase 204 comprises determining, at the radio access device, the wireless link to be sky communications on the basis of physical installation data of radio access device antenna for receiving the transmission. The physical installation data may comprise one or more of information at least indicating an antenna mast height, panel direction, antenna tilt and antenna mast structure.

In an example, phase 204 comprises determining, at the radio access device, the wireless link to be sky communications on the basis of a communications direction of a receiving antenna. The communications direction of the receiving antenna may be the communications direction of the radio access device's antenna. The communications direction may be determined on the basis of a tilt, e.g. a tilting angle, of the antenna and/or a tilt of a beam of the antenna. Antenna tilting and/or beam steering may be used to adjust the communications direction.

In an example, phase 204 comprises determining, at the radio access device, the wireless link to be sky communications on the basis of topographic information of an area underlying the wireless link. The topographic information may indicate that the ground level decreases from a receiving antenna towards the user radio device, whereby the horizon seen by the receiving antenna is lower and thermal noise seen by the receiving antenna is reduced.

In an example, phase 204 comprises determining, at the radio access device, the wireless link to be sky communications on the basis of a change of signal to noise ratio at the radio access device. The signal to noise ratio indicates a ratio of a signal power received from the user radio device to a noise power at the radio access device. The noise power includes thermal noise power and possible co-channel interference. The signal to noise ratio may be compared with a threshold that may be e.g. 8 dB that may be considered a possible reduction for the SNR for thermal noise temperature of 50K base on [1].

In an example, phase 204 comprises determining, at the radio access device, the wireless link to be sky communications on the basis of a handover of the user radio device between a cell for ground communications and a cell for sky communications. One or more cells may be dedicated for ground communications and one or more cells may be dedicated for sky communications. A cell may be identified to be for sky communications on the basis of a cell identifier of the cell and/or signaling associated with handover, for example information indicating the cell to be for sky communications included in a handover message.

In an example, phase 204 comprises determining at the radio access device, the wireless link to be sky communications on the basis of three-dimensional (3D) position information of the user radio device. The radio access device may have information of positions for example coordinate information of positions of the user radio device, where the wireless link should be determined to be sky communications and/or ground communications. The 3D position information comprises for example coordinates according to the GPS.

In an example, phase 204 comprises that the power adjustment is determined on the basis of a signal-to-noise ratio of one or more transmission from the user radio device. The power adjustment may be different for sky communications and ground communications.

Figure 3:
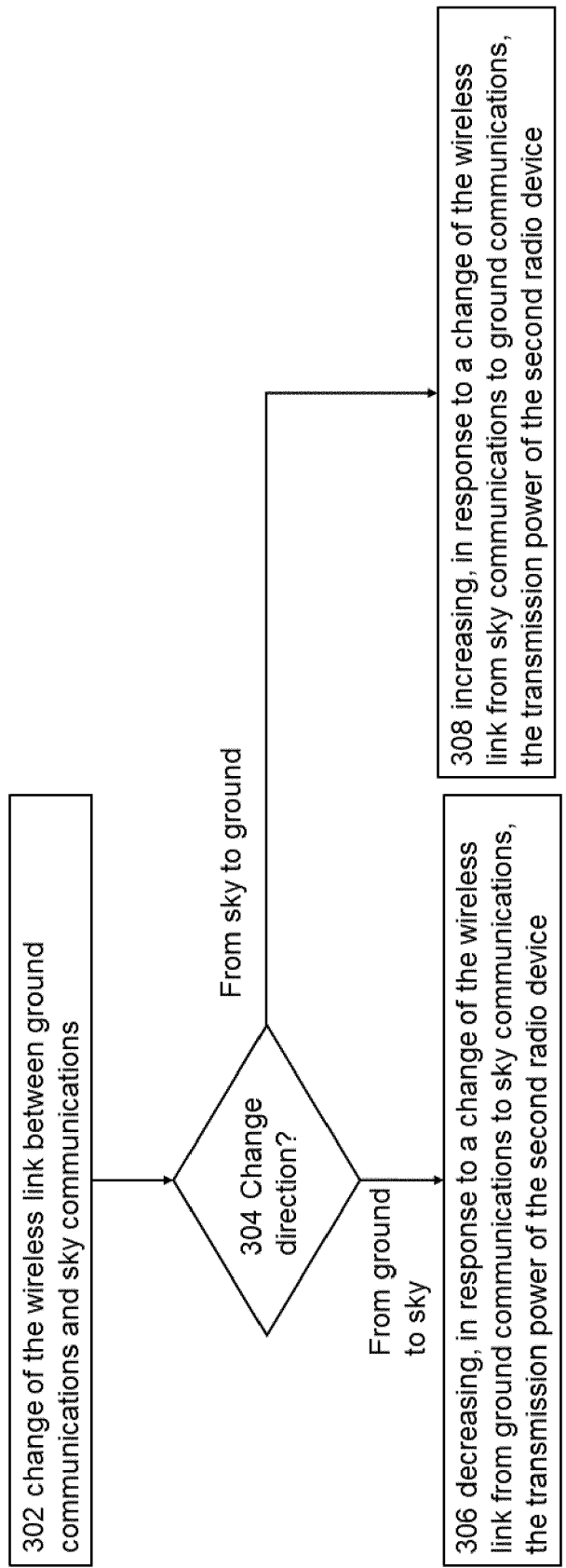

Referring to FIG. 3, a method for supporting co-channel interference mitigation in an event of a wireless link changing between a sky communications and ground communications. The method phases may be performed by a radio access device, for example.

Phase 302 comprises determining at a radio access device, a change of a wireless link between ground communications and sky communications.

Phase 304 comprises determining, at the radio access device, a direction of the change. The direction may be from ground communications to sky communications or from sky communications to ground communications. If the change is from ground communications to sky communications the method may proceed to phase 306.

Phase 306 comprises decreasing, by the radio access device, in response to a change of the wireless link from ground communications to sky communications, the transmission power of the user radio device. In this way the transmission power of the radio device may be reduced to mitigate co-channel interference.

Phase 308 comprises increasing, by the radio access device, in response to a change of the wireless link from sky communications to ground communications, the transmission power of the user radio device. In this way the transmission power of the radio device may be increased to achieve a sufficient signal-to-noise ratio on the wireless link.

Figure 4:
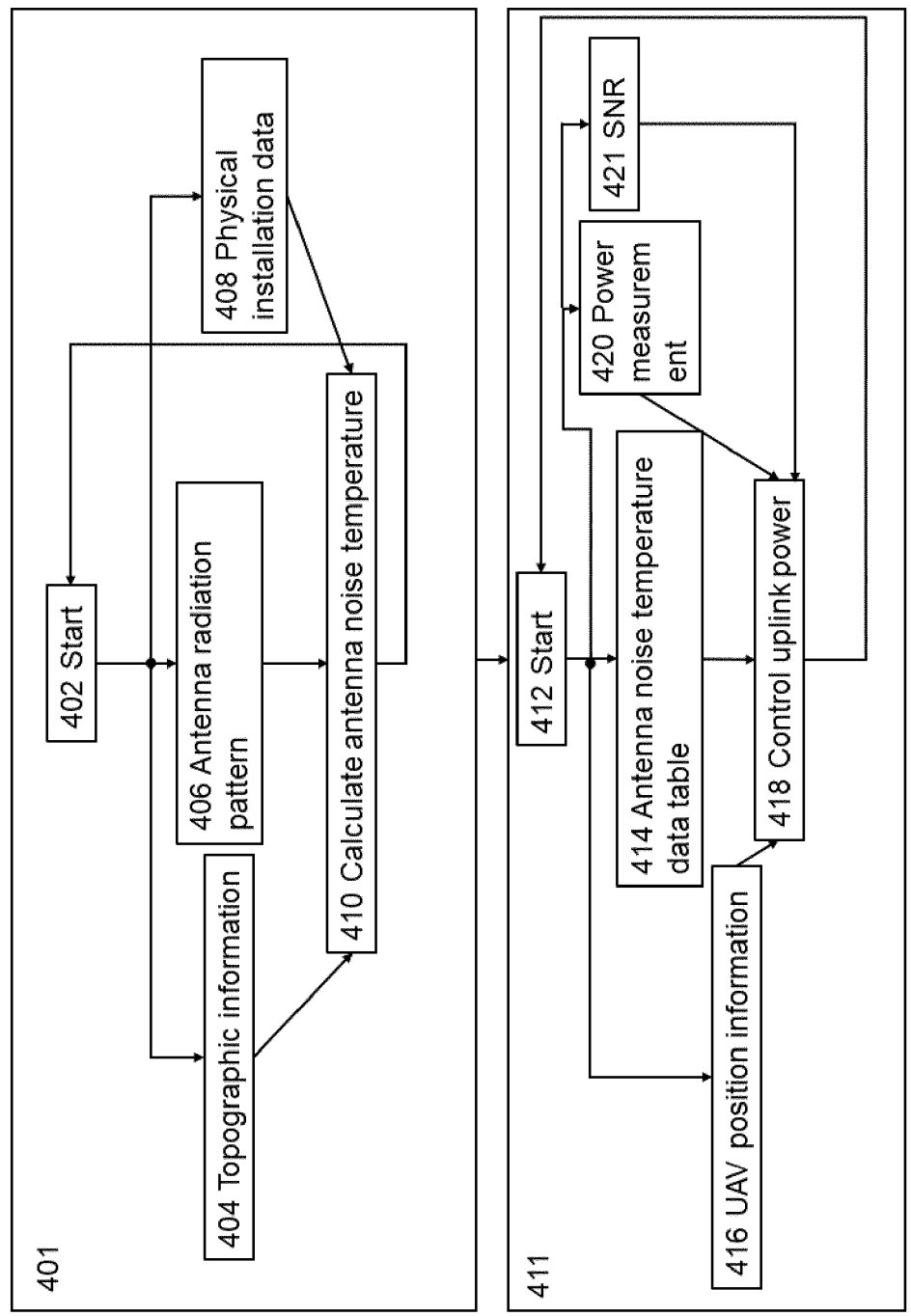

Referring to FIG. 4 there is provided a method for supporting co-channel interference mitigation by a transmission power control of a wireless link in a communications network configured for ground communications and sky communications.

The wireless link may be between two radio devices of which one is controlling a transmission power of another radio device in accordance with the method described in FIG. 2. The method phases may be performed by a radio access device, for example.

Phase 401 comprises determining, at a radio access device, an antenna noise temperature.

Phase 411 comprises controlling a transmission power of a user radio device on the basis of whether the wireless link between the user radio device and the radio access device is sky communications or ground communications.

Phase 402 comprises executing one or more of phases 404 to 408 for determining an antenna noise temperature in phase 410. It should be appreciated that the phases 404 to 410 may be executed once or more than once, for example the antenna noise temperature may be determined in a continuous loop.

Phase 404 comprises obtaining, at the radio access device, topographic information. The topographic information may comprise topographic information of an area underlying the wireless link. In an example the topographic information comprises a topographic map. The topographic information provides that a change of elevation of the ground between radio devices may be used to determine whether the wireless link between the radio devices is sky communications or ground communications. For example, sky communications may be determined at least in part on the basis of a threshold for an antenna tilt or a direction of an antenna radiation pattern. Then, when the elevation of the ground is increasing towards a radio device, the threshold for an antenna tilt or a direction of an antenna radiation pattern may be also increased. On the other hand, when the elevation of the ground is decreasing towards a radio device, the threshold for an antenna tilt or a direction of an antenna radiation pattern may be also decreased. Antenna tilt 13 is a measure of how much the antenna or beam is pointing up or down relative to a horizontal reference radiation pattern. This can be adjusted mechanically during installation during operation or electronically using antenna beam steering means.

Phase 406 comprises determining, at the radio access device, an antenna radiation pattern. The antenna radiation pattern indicates a communications direction of the antenna, for example a direction of the main lobe. The antenna radiation pattern may be a three-dimensional (3D) radiation pattern, for example. The antenna pattern may be the antenna pattern of the receiving antenna at the radio access device, whereby a gain of the receiving antenna at one radio device of a wireless link may be determined in a direction of another radio device of the wireless link. In an example, the antenna radiation pattern may be defined by data derived from antenna specifications or from on-site measurements and stored in a computer-readable format.

Phase 408 comprises determining, at the radio access device, physical installation data. The physical installation data may comprise physical installation data of the installation of the radio access device. The physical installation data may comprise at least one or more of antenna mast height, antenna panel direction, antenna tilt and antenna mast mechanical structure. The physical installation data may define installation data of an antenna at a radio device performing power control of transmission power of another radio device of the wireless link. In an example, the physical installation data may be defined by data from CAD drawings or similar and stored in a computer-readable format.

Phase 410 comprises calculating, at the radio access device, an antenna noise temperature. The antenna noise temperature may be calculated on the basis of the topographic information, the physical installation data and the antenna radiation pattern of the phases 404 to 408. The antenna noise temperature may be calculated by an average of the noise temperature profile of the antenna electromagnetic environment weighted by the antenna gain pattern. The effective antenna noise temperature may be calculated by convoluting the background noise data with the antenna beam pattern. The antenna noise temperature may be calculated using:

$$T_{Ant}(\beta) = \frac{\int_0^{2\pi} d\varphi \int_0^{\pi} d\vartheta \sin(\vartheta) * G(\beta, \vartheta, \varphi) * T_{ambient}(\vartheta)}{\int_0^{2\pi} d\varphi \int_0^{\pi} d\vartheta \sin(\vartheta) * G(\beta, \vartheta, \varphi)} \quad (1)$$

where $\beta$ denotes antenna tilt; $\vartheta$ denotes elevation angle, 90 degrees at horizon; $\varphi$ denotes azimuth angle; $T_{ambient}$ denotes temperature of background radiation; $G(\beta, \vartheta, \varphi)$ denotes antenna beam pattern; and $T_{ambient}$ may be defined by $$T_{ambient}(\vartheta) = \frac{1° K}{0.413 * \cos(\vartheta) + 0.013} \quad \text{for } 0° \leq \vartheta < 90° \quad (2)$$

$$T_{ambient}(\vartheta) = 200° K - 90° K * \cos(\vartheta) \quad \text{for } 90° \leq \vartheta \leq 180°$$

It should be appreciated that although $T_{ambient}$ may be defined using the Formula (2) above, $T_{ambient}$ may also be defined on the basis of empirical means described in [1]. In Formula (1) the denominator may be a measure of normalized power received by the antenna assuming the same RF power received from all directions of a sphere. Accordingly, based on the $T_{ambient}$ defined using the formulas above, the $T_{ambient}$ is not only a function of the elevation angle $\vartheta$, but is also a function of the azimut angle $\varphi$, which enables more accurate definition of $T_{ambient}$ particularly in built areas, mountains and hilly terrain, and particularly if directionality of the antenna is high. Accordingly, for accurate definition of $T_{ambient}$ both the elevation angle $\vartheta$ and the azimuth angle $\varphi$ since $T_{ambient}$ may change very quickly as a function of absence or presence of obstructions caused by terrain or buildings. Therefore, the elevation angle $\vartheta$ may be offset, based on map data, topographic data as well as buildings including building height. The offset elevation angle Ds can be described as the angle between the visible horizon and "horizontal level" (flat terrain) in all directions, 360 deg. In an example of the offset, if the horizon in a specific direction $\varphi_s$ is at +10 degrees compared with "horizontal level", $\vartheta s(\varphi, h)$ may be obtained by subtracting 10 deg from $\vartheta$ in the formulas for $T_{ambient}$ above. In another example, in downhill directions where only a large flat plain or sea is visible, the following formula may be used to obtain ϑs: ϑs(h)=90−sin⁻¹(Earth Radius/(Earth Radius+h)), where h is the antenna height from the ground.

TABLE 1

Example values for ϑs (h) using the Earth radius 6360 km

| h [m] | ϑs (h) [deg] |
|---|---|
| 100 | 0.32 |
| 200 | 0.45 |
| 400 | 0.64 |
| 800 | 0.91 |
| 1600 | 1.29 |
| 3200 | 1.82 |
| 6400 | 2.57 |

In an example phase 410 comprises constructing an antenna noise temperature data table for determining antenna noise temperature for phase 411. An example of the antenna noise temperature data table may be in accordance with Table 2.

TABLE 2

3D antenna noise temperature data table

| | Antenna or beam tilt β | Topographic Horizon Correction ϑs (φ) | ϑ(φ) = ϑ + ϑs (φ, h) | Formula (1) above. $T_{ant}$ (β, ϑ(φ)) |
|---|---|---|---|---|
| Range | −45 to 45? | 0-360 | 0-360 | 4-300 |
| Resolution Depends on antenna design | <= 1 | <= 1 | <= 1 | <= 1 |
| Format Unit | Number [deg] | Vector [deg] | Vector [deg] | Number [K] |
| Example according to FIG. 7 | 0 | ϑs (φ₁, φ₂) = (0, 5) | ϑ(φ₁, φ₂) = (−0.91, 5) | (50, 125) |

Phase 412 comprises performing one or more of phases 416, 414, 420 for controlling the transmission power of a user radio device on the basis of whether the wireless link between the user radio device and the radio access device is ground communications or sky communications. The wireless link is determined to be sky communications or ground communications on the basis of antenna noise temperature of the radio access device antenna.

Phase 414 comprises obtaining an antenna noise temperature data table. The antenna noise temperature data table may be in accordance with Table 2. Phase 416 comprises determining 3D position information of the user radio device. The 3D position information may provide determining a position of the user radio device with respect to the antenna of the radio access device. In an example, the user radio device may be configured to determine its 3D position e.g. the user radio device may comprise a Global Positioning System (GPS) receiver, and optionally also an altimeter, for determining a position of the user device and the position determined by the user device may be transmitted by the user radio device to radio access device, whereby the position is received by the radio access device. Phase 420 comprises obtaining one or more power measurements. A power measurement may be obtained by measuring at the radio access device a received power from the user radio device and/or measuring at the user radio device a received power from the radio access device. Phase 421 comprises obtaining one or more power signal-to-noise ratios (SNRs) measured at the radio access device. The SNRSs indicate a relationship between signal level received from one or more user radio devices and noise power. The noise power may include at least the thermal noise power. Also other noise components may be present in the noise power. Phase 418 may comprise controlling the transmission power of the user radio device. Phase 418 may comprise determining the antenna noise temperature at the radio access node on the basis of the antenna noise temperature data table, 3D position information of the user radio device, the SNR and the power measurement. If, on the basis of the antenna noise temperature, the wireless link between the user radio device and the radio access device is sky communications, at least one power adjustment for controlling the transmission power of the user radio device in accordance with one or more power control parameters for sky communications may be determined. The power adjustment may be used for controlling the transmission power in accordance with phase 206. The method may continue to phase 412 for continuing the transmission power control. In an example, the wireless link between the user radio device and the radio access device is sky communications, when the antenna noise temperature may be for example up to 200K. Also smaller values may be used, in the range of 200K to 100K or less, 50K or less, particularly 10K or less for a directional antenna and particularly 4K or less for an antenna with increased directionality.

Figure 5:
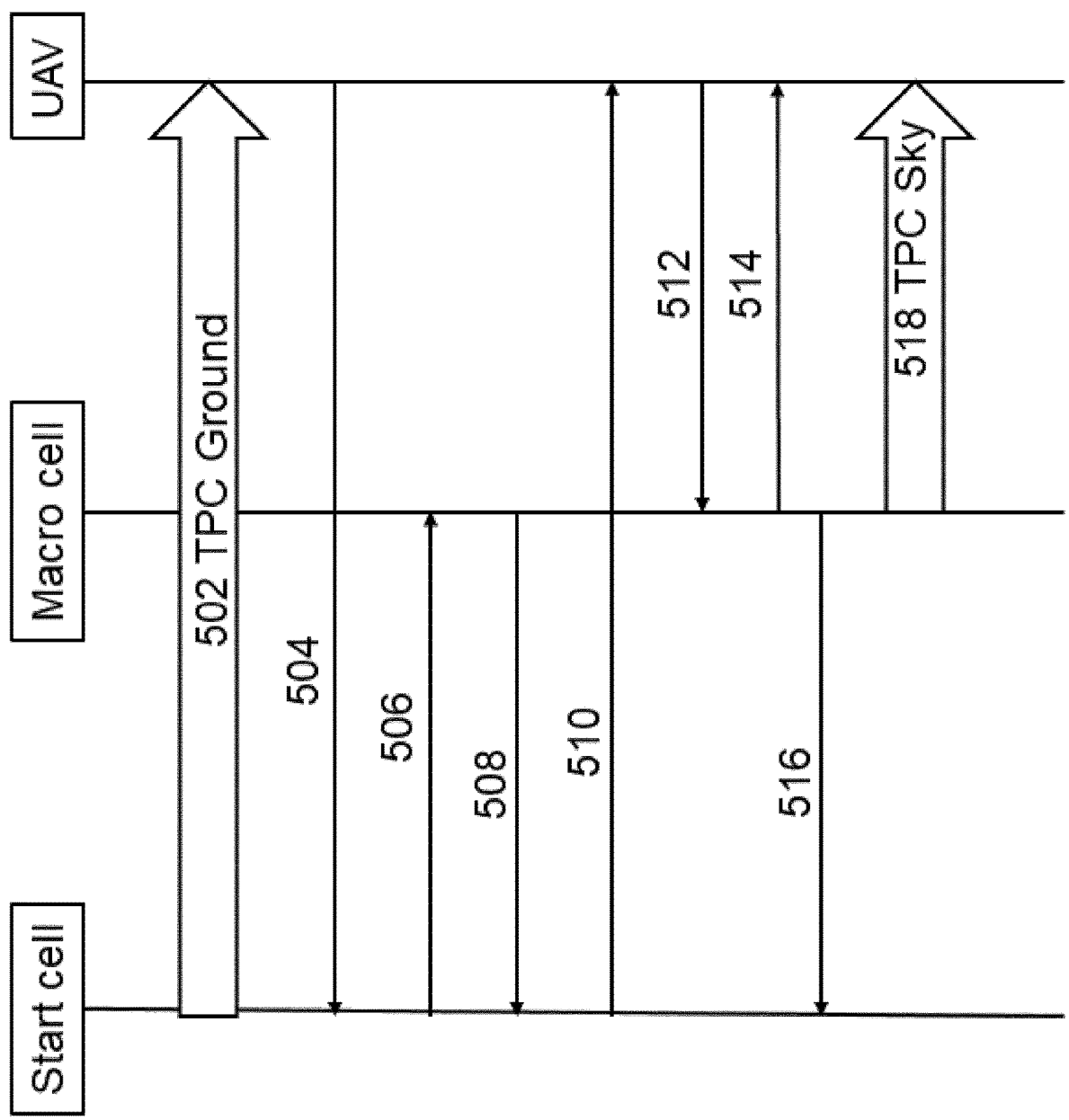
FIG. 5 illustrates an example of a sequence in accordance with at least some embodiments of the present invention.

FIG. 5 illustrates an example of a sequence in accordance with at least some embodiments of the present invention. The sequence illustrates controlling a transmission power of an UAV in connection with a handover from a start cell to a target cell in a communications network. The start cell and the target cell provide that the communications network is configured for sky communications and ground communications. The communications network is configured for sky communications and ground communications when the communications network comprises one or more radio devices configured for sky communications and one or more radio devices configured for ground communications. The radio devices may be configured for ground communications and sky communications at least on the basis of communications directions of their antennas. In the example of FIG. 5, the start cell may be dedicated for ground communications and the target cell may be dedicated for sky communications. For example, antenna of the start cell may be tilted below the horizon and towards the ground and antenna of the target cell may be tilted above the horizon and towards the sky. The target cell may be a macro cell and the source cell may be a micro cell. The start cell and the target cell may be provided by a single base station or the start cell and the target cell may be provided by different base stations. Same base station can be used for this by use of beamforming or beam tracking thereby dynamically tracking elevation change between radio devices, e.g. a UE and a base station. However, in the sequence, separate base stations for the start cell and the target cell are assumed.

Phase 502 comprises controlling a transmission power of the UAV by a base station of the start cell. Controlling the transmission power may comprise determining, at the base station of the start cell, at least one power adjustment for controlling the transmission power of the UAV in accordance with one or more power control parameters for ground communications. Examples of the power adjustment comprise a power control step to increase or power control step to decrease the transmission power of the UAV. The power control step size may be in accordance with the power control parameters for ground communications.

Phase 504 comprises receiving from the UAV a measurement that causes at the base station of the start cell to trigger a handover of the UAV to the target cell. Examples of the measurement comprise at least a Reference Signal Received Power measurement.

Phase 506 comprise sending a message indicating a handover start from the base station of the start cell to the base station of the target cell.

Phase 508 comprise sending a message indicating a handover confirm from the base station of the target cell to the base station of the start cell.

Phase 510 comprise sending a message indicating a handover command from the base station of the start cell to the UAV.

Phase 512 comprises the UAV performing a Random Access Channel (RACH) procedure to the target cell.

Phase 514 comprises the UAV receiving a message indicating a handover response from the target cell. The handover response may indicate a change of the wireless link from ground communications to sky communications. The handover response may comprise at least one power adjustment for controlling the transmission power of the UAV in accordance with one or more power control parameters for sky communications. In an example the power adjustment may comprise a power adjustment for decreasing the transmission power of the UAV.

Phase 516 comprises the base station of the start cell receiving a message indicating handover complete from the base station of the target cell.

Phase 518 comprises controlling a transmission power of the UAV by the base station of the target cell. Controlling the transmission power may comprise determining, at the base station of the target cell, at least one power adjustment for controlling the transmission power of the UAV in accordance with one or more power control parameters for sky communications.

Figure 6:
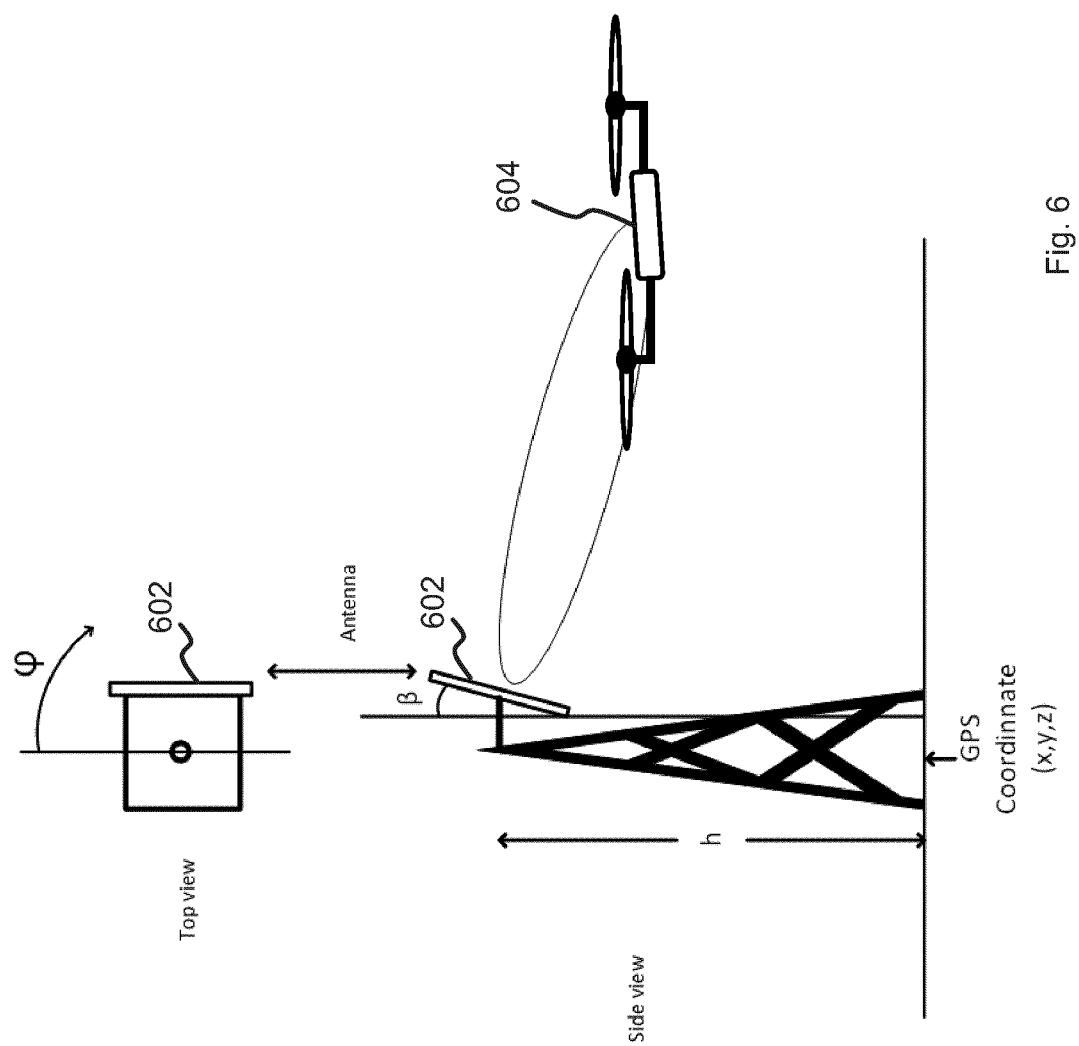
FIG. 6 illustrates an example of an antenna installed to a communications network in accordance with at least some embodiments of the present invention.
Figure 7:
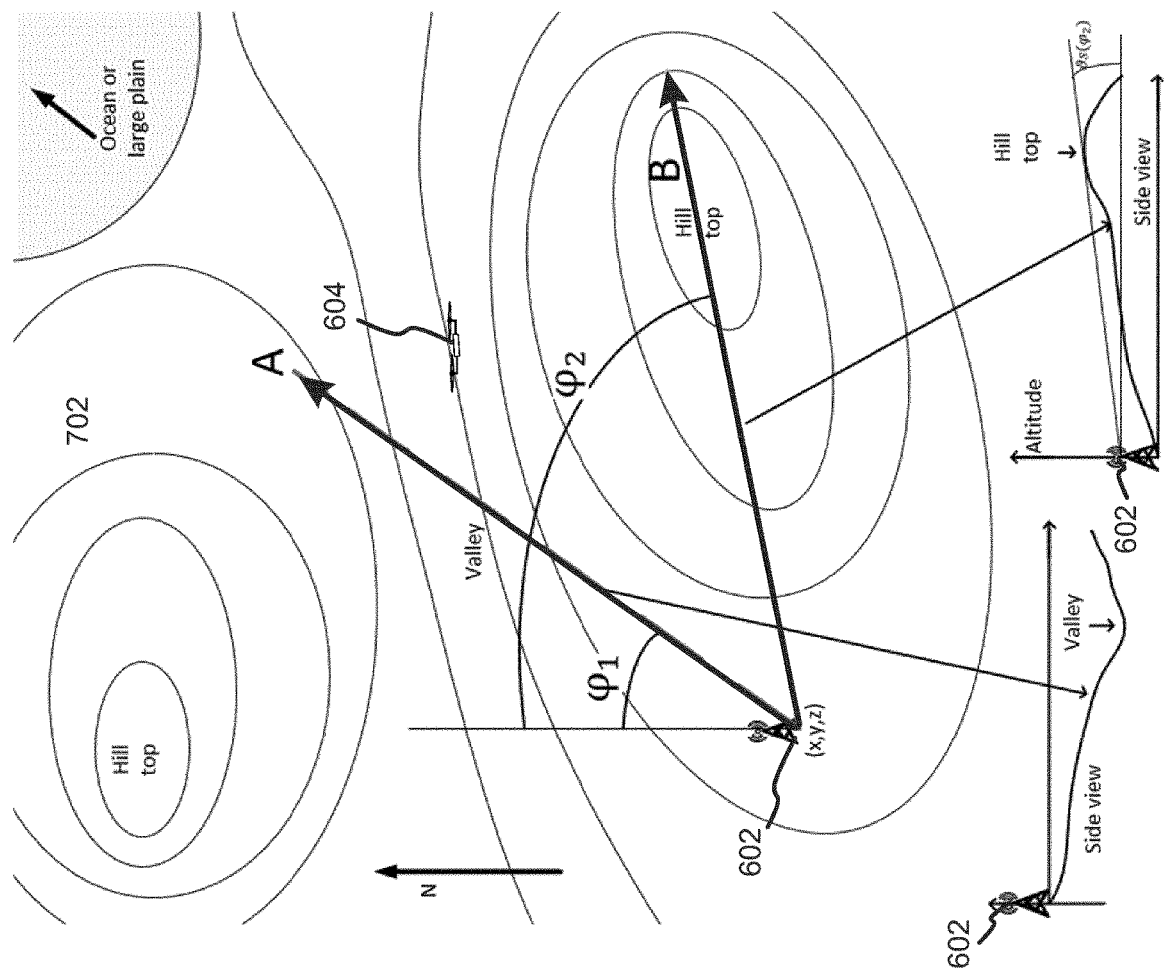
FIG. 7 illustrates topographic information for controlling power of a radio device in accordance with at least some embodiments of the present invention.
Figure 9:
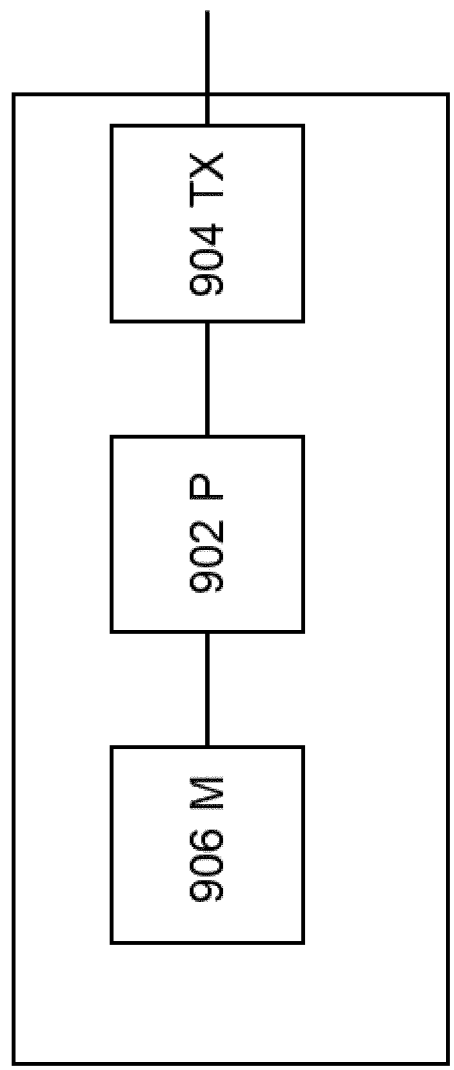
FIG. 9 illustrates an apparatus in accordance with at least some embodiments of the present invention.

Next, examples in accordance with at least some embodiments are described in a context of an (e/g)NodeB controlling a transmission power of an UAV with reference to FIG. 6, FIG. 7 and the antenna noise temperature data in Table 2. FIG. 6 illustrates an example of installation of an (e/g) NodeB and FIG. 7 illustrates topographic information for controlling power of an UAV. Referring to FIG. 6 the (e/g)NodeB comprises at least one antenna 602 that is installed to a mast at a height h above the ground with a tilt angle β and an azimuth angle φ. The antenna is illustrated by a top view and a side view. The installation location of the antenna may be determined on the basis of Global Positioning System (GPS) coordinates and/or a base station position database. The tilt angle β, or elevation, of the antenna may define a communications direction of the antenna in a vertical plane. At least in some examples the tilt may be adjustable such that the communications direction of the antenna may be maintained in a direction towards the UAV 604, even if altitude of the UAV increases or decreases. The tilt of the antenna defines whether the communications direction of the antenna is directed towards the horizon, directed above the horizon, i.e. towards the sky, or directed below the horizon, i.e. towards the ground. Therefore, tilting of the antenna may support communications between the UAV and the (e/g)NodeB over a wireless link that is sky communications. FIG. 6 illustrates a situation, where the antenna is tilted at angle towards the ground. It should be appreciated that although FIG. 9 illustrates a physical tilt of the antenna to direct the communications direction of the antenna, alternatively or additionally beam steering may be used for directing the communications direction of the antenna. Azimuth angle φ of the antenna may define a direction of the antenna in a horizontal plane. At least in some examples the azimuth angle may be adjustable such that the communications direction of the antenna may be maintained in a direction towards the UAV 604, even if the UAV moves in a horizontal direction. Referring to FIG. 7 topographic information is provided by a map 702 of the installation area of the (e/g)NodeB 602. A first position of the UAV with respect to the (e/g)NodeB may be at position "A" on the map, where the antenna 602 has azimuth angle $\varphi_1$ towards the "A". A subsequent position of the UAV with respect to the (e/g)NodeB may be at position "B" on the map, where the antenna 602 has azimuth angle $\varphi_2$ towards the "B". FIG. 7 illustrates side views that show topography for a wireless link between the (e/g)NodeB and UAV in both positions of the UAV. In the first position of the UAV, the UAV is flying above a valley and the ground level is decreasing from the antenna 602 towards the UAV. Therefore, there is free sky behind the UAV as seen from the (e/g)NodeB. In the second position of the UAV 604, the UAV is flying above a hilltop and the ground level is increasing from the antenna 602 towards the UAV 604. In the first position "A", because there is a plain or ocean behind the UAV as seen from the antenna 602, thermal noise at the antenna 602 may be sufficiently low for a wireless link between the (e/g)NodeB and the UAV to be determined, e.g. based on a level of the antenna noise temperature, as sky communications. It should be appreciate that the altitude of the UAV at position "A" may be higher than the installation height h of the antenna or even lower than the installation height h of the antenna, while the wireless link may still be sky communications provided that the thermal noise at the antenna is sufficiently low. In the subsequent position "B", because the UAV is above the hilltop the horizon seen from the antenna 602 is at a higher elevation than in the position "A" of the UAV. Therefore, the communications direction of the antenna may be adjusted by tilting or beam steering to be directed above the hilltop for the wireless link to be sky communications. However, if the wireless link between the antenna and the UAV at position "A" is sky communications and the UAV is moved to the position "B" without adjusting the tilt of the antenna or beam steering, the thermal noise temperature of the antenna is increased and the wireless link is changed to ground communications.

In an example of the movement of the UAV and transmission power control of the UAV by the (e/g)NodeB, using the values of the last row of Table 2, it may be assumed that antenna beam of beam of the (e/g)NodeB antenna is relatively narrow compared with a change of azimuth angles, $\varphi_2-\varphi_1$, between two locations "A" and "B" of the UAV, when the UAV is moved from "A" to "B". In this example, the (e/g)NodeB antenna is pointing with the same elevation angle, i.e. tilt, towards the UAV, when the UAV is moved from "A" to "B". The antenna height of the (e/g)NodeB may be 800 m above the sea level or a large plain and $\vartheta s(800$ m$)=0.91$ deg. The offset of the elevation angle for the noise temperature of the (e/g)NodeB antenna directed towards the location "B", is $\vartheta s(\varphi_2)=5$ degrees, which is the elevation angle between the antenna position and the hill top at "B". $\vartheta s$ will therefore vary by 5.91 degrees between UAV position "A" and "B". It may be expected, for example based on the references [1] and [2], that a change to the antenna thermal noise temperature may be as much as 125K for 5 deg elevation change from "A" to "B". The noise temperature change of 125 K may cause a 5 dB increase of the total thermal noise level. Therefore, when the UAV is at location A the UAV may reduce its output power by 5.4 dB while keeping the SNR constant at the (e/g)NodeB, compared with if the UAV was at location B.

When the UAV is at the location "A" and flying across the valley, the (e/g)NodeB antenna may be pointing through the valley and towards a plain or ocean behind the valley. During this time the wireless link between the (e/g)NodeB and the UAV may be determined to be sky communications at least based on a level of the antenna noise temperature. When the UAV is flying from the valley towards the hill, the wireless link is changed from sky communications to ground communications since the antenna tilt is maintained. When the wireless link is sky communications, the noise temperature at the (e/g)NodeB may be lower than when the wireless link is ground communications. for example, the UAV may have the highest output power when flying over the top of the hill and the (e/g)NodeB antenna is pointing towards the hill. On the other hand the UAV may have the lowest output power, when flying across the valley where the (e/g)NodeB antenna is pointing through the wally towards a plain or ocean a behind the wally.

Accordingly, the (e/g)NodeB performing transmission power control of the UAV, may decrease transmission power of the UAV, when the wireless link is changed from ground communications to sky communications. On the other hand, the (e/g)NodeB may increase transmission power of the UAV, in response to determining a change of the wireless link from sky communications to ground communications.

It should be appreciated that adjustment of the elevation angle during movement of the UAV from "A" to "B" may be possible, whereby signal-to-noise ratio at (e/g)NodeB receiver output may be at least partially optimized. Provided that the elevation angle is sufficiently increased from position "A" to "B" and the UAV is above the horizon at location "B", the wireless link between the (e/g)NodeB and the UAV may be sky communications, when the UAV is at location "B".

Figure 8:
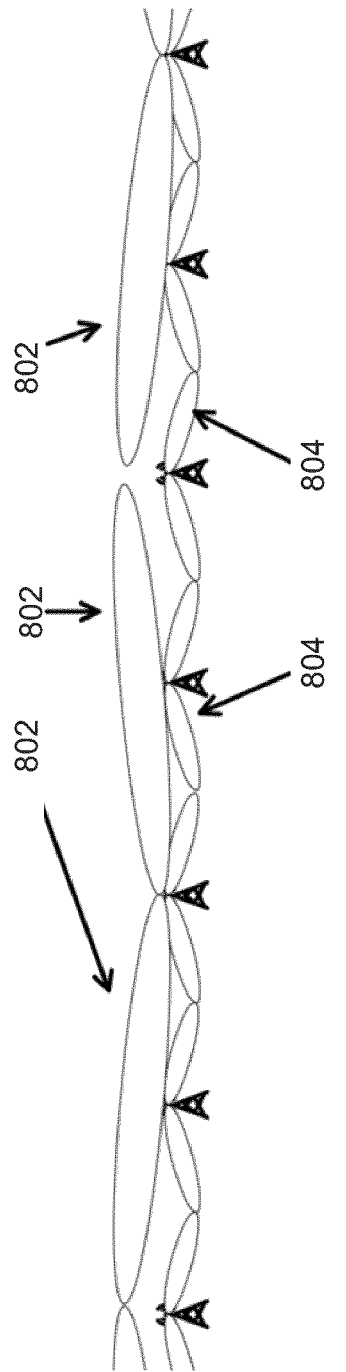
FIG. 8 illustrates a communications network for sky communications and ground communications in accordance with at least some embodiments of the present invention.

FIG. 8 illustrates an example of a communications network configured for sky communications and ground communications. The communications network 1100 may be a radio access network of the wireless communications access network in FIG. 1. The communications network may comprise one or more cells 802 dedicated for communications with UAV, i.e. UAV cells, and one or more cells 804 for communications with terrestrial radio devices. In an example, the cells dedicated for communications with UAV may comprise a target cell and the cells dedicated for communications with terrestrial radio devices may comprise a source in the sequence described in FIG. 5. Terrestrial radio devices comprise at least radio devices that are located in directions of antennas towards the ground. Directions of the antennas towards the ground comprise at least directions, where a main lobe of an antenna is directed below the horizon. Accordingly, the cells 804 for communications with the terrestrial radio devices may have their main beams directed below the horizon. The cells 802 dedicated for communications with UAV comprise at least cells that have their main beams directed above the horizon. The beams may be directed by antenna beam steering and/or antenna tilting. Additionally or alternatively, the cells 802 dedicated for communications with UAV may have larger coverage areas that the cells 804 for communications with terrestrial radio devices. The large coverage areas of the UAV cells, antenna tilting and/or beam steering support a low number of handovers of the UAVs connected to the UAV cells. Additionally, radiation patterns of the antennas for UAV cells may be designed with at least partially optimized noise temperature performance in mind: Low side loop levels towards the ground and a main loop with deep notch in the radiation pattern towards ground. Beamsteering is part of the 5G NR system design for sub 6 GHz as well as at mm wave.

FIG. 9 illustrates an example of an apparatus in accordance with at least some embodiments of the present invention. The apparatus may be a radio device, for example a radio access node or a user radio device or a part of a radio access node or a user radio device.

The apparatus comprises a processor (P) 902 and a transceiver (TX) 904. The processor is operatively connected to the transceiver for controlling the transceiver. The apparatus may comprise a memory (M) 906. The memory may be operatively connected to the processor. It should be appreciated that the memory may be a separate memory or included to the processor and/or the transceiver.

According to an embodiment, the processor is configured to control the transceiver and/or to perform one or more functionalities described according to an embodiment.

A memory may be a computer readable medium that may be non-transitory. The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, computer code etc. should be understood to express software for a programmable processor firmware such as the programmable content of a hardware device as instructions for a processor or configured or configuration settings for a fixed function device, gate array, programmable logic device, etc.

Although the above examples describe embodiments of the invention operating within a radio access device or a gNB, it would be appreciated that the invention as described above may be implemented as a part of any apparatus comprising a circuitry in which radio frequency signals are transmitted and/or received. Thus, for example, embodiments of the invention may be implemented in a mobile phone, in a base station, in a radio station, in a user radio device, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:
(a) hardware-only circuit implementations (such as implementations in only analogue and/or digital circuitry) and
(b) combinations of hardware circuits and software, such as (as applicable):
(i) a combination of analogue and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

REFERENCES

[1] "Numerical Evaluation of Antenna Noise Temperature for Optimal Reflector Antenna Designs", Shenheng Xu and Yahya Rahmat-Samii, 2011 IEEE International Symposium on Antennas and Propagation (APSURSI), 3-8 Jul. 2011.
[2] Influence of Antenna Noise Temperature and Downtilt on WCDMA Base Station Capacity, Karl-August Steinhauser, KATHREIN-Werke KG, Rosenheim, Germany, 2009 3rd European Conference on Antennas and Propagation, 23-27 Mar. 2009.

EXAMPLES

Example 1: A method comprising:
controlling, at a first radio device of a communications network configured for ground communications and sky communications, a transmission power of a second radio device; determining, at the first radio device, if a wireless link between the second radio device and the first radio device is sky communications, at least one power adjustment for controlling the transmission power of the second radio device in accordance with one or more power control parameters for sky communications; and
controlling, by the first radio device the transmission power of the second radio device on the basis of the determined at least one power adjustment.

Example 2: The method according to examples 1, comprising:
determining, at the first radio device, if the wireless link between the second radio device and the radio device is ground communications, at least one power adjustment for controlling the transmission power of the second radio device in accordance with one or more power control parameters for ground communications.

Example 3: The method according to examples 1 or 2, comprising:
determining, at the first radio device, whether the wireless link between the second radio device and the radio device is ground communications or sky communications on the basis of at least one of:
an antenna noise temperature of the first radio device;
a change of signal to noise ratio at the first radio device;
a handover of the second radio device between a cell for ground communications and a cell for sky communications;
3D position information of the second radio device;
topographic information of an area underlying the wireless link;
a communications direction of a receiving antenna;
physical installation data of first radio device antenna for receiving the transmission.

Example 4: The method according to examples 3, comprising:
determining, at the first radio device, the wireless link between the second radio device and the radio device to be sky communications, on the basis of an antenna noise temperature of 50K or less, particularly 10K or less for a directional antenna and particularly 4K or less for an antenna with increased directionality.

Example 5: The method according to any of examples 1 to 4, comprising:
decreasing, by the first radio device, in response to a change of the wireless link from ground communications to sky communications, the transmission power of the second radio device.

Example 6: The method according to any of examples 1 to 5, comprising:
increasing, by the first radio device, in response to a change of the wireless link from sky communications to ground communications, the transmission power of the second radio device.

Example 7: The method according to any of the preceding examples, wherein the first radio device is a radio access device and the second radio device is a user radio device.

Example 8: An apparatus comprising:
means for controlling, at a first radio device of a communications network configured for ground communications and sky communications, a transmission power of an second radio device;
means for determining, at the first radio device, if a wireless link between the second radio device and the radio device is sky communications, at least one power adjustment for controlling the transmission power of the second radio device in accordance with one or more power control parameters for sky communications; and means for control, by the first radio device the transmission power of the second radio device on the basis of the determined at least one power adjustment.

Example 9: The apparatus according to example 8, comprising:

means for determining, at the first radio device, if the wireless link between the second radio device and the radio device is ground communications, at least one power adjustment for controlling the transmission power of the second radio device in accordance with one or more power control parameters for ground communications.

Example 10: The apparatus according to example 8 or 9, comprising:

means for determining, at the first radio device, whether the wireless link between the second radio device and the radio device is ground communications or sky communications on the basis of at least one of:
an antenna noise temperature of the first radio device;
a change of signal to noise ratio at the first radio device;
a handover of the second radio device between a cell for ground communications and a cell for sky communications;
3D position information of the second radio device;
topographic information of an area underlying the wireless link;
a communications direction of a receiving antenna;
physical installation data of first radio device antenna for receiving the transmission.

Example 11: The apparatus according to example 10, comprising:

means for determining, at the first radio device, the wireless link between the second radio device and the radio device to be sky communications, on the basis of an antenna noise temperature of 50K or less, particularly 10K or less for a directional antenna and particularly 4K or less for an antenna with increased directionality.

Example 12: The apparatus according to any of examples 8 to 11, comprising:

means for decreasing, by the first radio device, in response to a change of the wireless link from ground communications to sky communications, the transmission power of the second radio device.

Example 13: The apparatus according to any of examples 8 to 12, comprising: means for increasing, by the first radio device, in response to a change of the wireless link from sky communications to ground communications, the transmission power of the second radio device.

Example 14: An apparatus according to any of examples 8 to 13, the first radio device is a radio access device node and the second radio device is a user radio device, or the first radio device is a user radio device and the second radio device is a radio access device node.

Example 15: An apparatus comprising:
a processor; and
a transceiver; wherein the processor is configured to:
control, at a first radio device of a communications network configured for ground communications and sky communications, a transmission power of an second radio device; determine, at the first radio device, if a wireless link between the second radio device and the first radio device is sky communications, at least one power adjustment for controlling the transmission power of the second radio device in accordance with one or more power control parameters for sky communications; and
control, by the first radio device, the transmission power of the second radio device on the basis of the determined at least one power adjustment.

Example 16: A computer program comprising computer readable program code means adapted to perform at least the following:

controlling, at an first radio device of a communications network configured for ground communications and sky communications, a transmission power of an second radio device; determining, at the first radio device, if a wireless link between the second radio device and the radio device is sky communications, at least one power adjustment for controlling the transmission power of the second radio device in accordance with one or more power control parameters for sky communications; and controlling, by the first radio device, the transmission power of the second radio device on the basis of the determined at least one power adjustment.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method, comprising:
controlling, at a first radio device of a communications network configured for ground communications and sky communications, a transmission power of a second radio device;
determining, at the first radio device, if a wireless link between the second radio device and the first radio device is sky communications, at least one power adjustment for controlling the transmission power of the second radio device in accordance with one or more power control parameters for sky communications; and
controlling, by the first radio device, the transmission power of the second radio device on the basis of the determined at least one power adjustment, wherein the at least one power adjustment comprises selecting between increasing or decreasing the transmission power of the second radio device.

2. The method according to claim 1, comprising:
determining, at the first radio device, if the wireless link between the second radio device and the radio device is ground communications, at least one power adjustment for controlling the transmission power of the second radio device in accordance with one or more power control parameters for ground communications.

3. The method according to claim 1, comprising:
determining, at the first radio device, whether the wireless link between the second radio device and the radio device is ground communications or sky communications on the basis of at least one of:
an antenna noise temperature of the first radio device;
a change of signal to noise ratio at the first radio device;
a handover of the second radio device between a cell for ground communications and a cell for sky communications;
3D position information of the second radio device;

topographic information of an area underlying the wireless link;
a communications direction of a receiving antenna;
physical installation data of first radio device antenna for receiving the transmission.

4. The method according to claim 1, comprising:
decreasing, by the first radio device, in response to a change of the wireless link from ground communications to sky communications, the transmission power of the second radio device.

5. The method according to claim 1, comprising:
increasing, by the first radio device, in response to a change of the wireless link from sky communications to ground communications, the transmission power of the second radio device.

6. The method according to claim 1, wherein the first radio device is a radio access device and the second radio device is a user radio device.

7. An apparatus, comprising:
at least one processor; and
at least one memory including computer program code, the at least one memory and computer program code being configured, with the at least one processor, to cause the apparatus to perform:
controlling, at a first radio device of a communications network configured for ground communications and sky communications, a transmission power of a second radio device;
determining, at the first radio device, if a wireless link between the second radio device and the radio device is sky communications, at least one power adjustment for controlling the transmission power of the second radio device in accordance with one or more power control parameters for sky communications; and
controlling, by the first radio device, the transmission power of the second radio device on the basis of the determined at least one power adjustment, wherein the at least one power adjustment comprises selecting between increasing or decreasing the transmission power of the second radio device.

8. The apparatus according to claim 7, wherein the at least one memory and computer program code are further configured, with the at least one processor, to cause the apparatus to perform:
determining, at the first radio device, if the wireless link between the second radio device and the radio device is ground communications, at least one power adjustment for controlling the transmission power of the second radio device in accordance with one or more power control parameters for ground communications.

9. The apparatus according to claim 7, wherein the at least one memory and computer program code are further configured, with the at least one processor, to cause the apparatus to perform:
determining, at the first radio device, whether the wireless link between the second radio device and the radio device is ground communications or sky communications on the basis of at least one of:
an antenna noise temperature of the first radio device;
a change of signal to noise ratio at the first radio device;
a handover of the second radio device between a cell for ground communications and a cell for sky communications;
3D position information of the second radio device;
topographic information of an area underlying the wireless link;
a communications direction of a receiving antenna;
physical installation data of first radio device antenna for receiving the transmission.

10. The apparatus according to claim 7, wherein the at least one memory and computer program code are further configured, with the at least one processor, to cause the apparatus to perform:
decreasing, by the first radio device, in response to a change of the wireless link from ground communications to sky communications, the transmission power of the second radio device.

11. The apparatus according to claim 7, wherein the at least one memory and computer program code are further configured, with the at least one processor, to cause the apparatus to perform:
increasing, by the first radio device, in response to a change of the wireless link from sky communications to ground communications, the transmission power of the second radio device.

12. An apparatus according to claim 7, wherein the first radio device comprises a radio access device node and the second radio device comprises a user radio device, or the first radio device comprises a user radio device and the second radio device comprises a radio access device node.

13. A computer program embodied on a non-transitory computer-readable medium, said computer program comprising computer readable program code which, when executed in hardware, cause the hardware to perform at least the following:
controlling, at a first radio device of a communications network configured for ground communications and sky communications, a transmission power of a second radio device;
determining, at the first radio device, if a wireless link between the second radio device and the radio device is sky communications, at least one power adjustment for controlling the transmission power of the second radio device in accordance with one or more power control parameters for sky communications; and
controlling, by the first radio device, the transmission power of the second radio device on the basis of the determined at least one power adjustment, wherein the at least one power adjustment comprises selecting between increasing or decreasing the transmission power of the second radio device.

* * * * *